United States Patent [19]
Pemberton

[11] 3,727,899
[45] Apr. 17, 1973

[54] SPRING SUSPENSION UNIT PARTICULARLY FOR VEHICLE SUSPENSION SYSTEMS

[75] Inventor: Robert C. Pemberton, Lansing, Mich.

[73] Assignee: Air Lift Company, Lansing, Mich.

[22] Filed: Apr. 7, 1971

[21] Appl. No.: 132,115

[52] U.S. Cl. .................................... 267/34, 267/65
[51] Int. Cl. ............................................ B60g 11/62
[58] Field of Search ..................... 267/34, 33, 615, 267/65

[56] References Cited

UNITED STATES PATENTS

| | | | |
|---|---|---|---|
| 2,969,974 | 1/1961 | Pemberton | 267/34 |
| 3,599,954 | 8/1971 | Yew | 267/65 |
| 3,001,783 | 9/1961 | Moody | 267/34 |

*Primary Examiner*—James B. Marbert
*Attorney*—Learman & McCulloch

[57] ABSTRACT

A spring suspension unit adapted to extend between spaced relatively movable members so as yieldably to maintain them in spaced relation and including a coil spring with an inflatable, resilient synthetic plastic bag disposed within the coil springs and expandable to dispose side wall portions of the bag between the convolutions of the spring. The bag is formed of cup-shaped portions having projecting flanges at their open ends which are heat-sealed in abutting air-sealed relation and provide a radially projecting spring convolution engaging ring. Either a valve or a connector forms a part of the bag for facilitating the introduction of air under pressure thereto.

14 Claims, 7 Drawing Figures

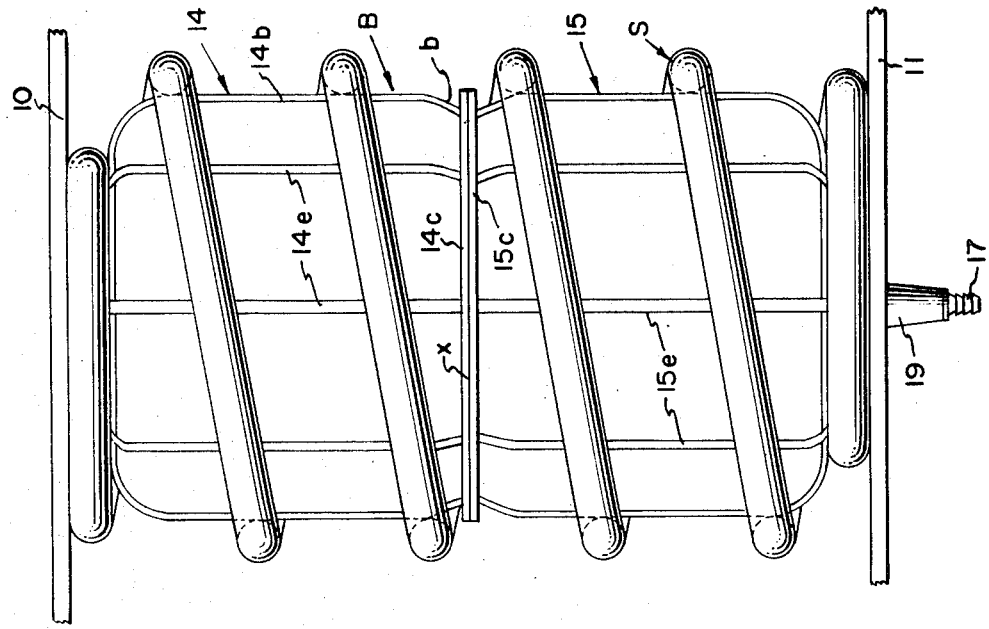
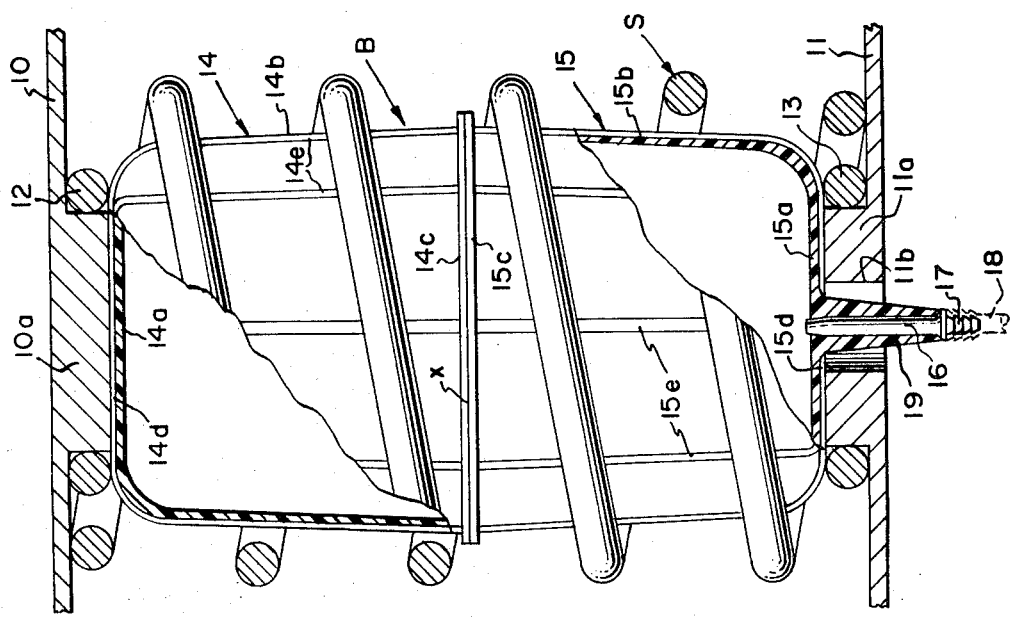

PATENTED APR 17 1973  3,727,899

INVENTOR
ROBERT C. PEMBERTON
BY Learman & McCulloch
ATTORNEYS

SPRING SUSPENSION UNIT PARTICULARLY FOR VEHICLE SUSPENSION SYSTEMS

BACKGROUND OF THE INVENTION

Supplemental air devices for vehicle suspension systems are known and a rubber bag disposed within a vehicle suspension coil spring is described, for example, in the Linley C. Pemberton U.S. Pat. No. 2,710,184 granted June 7, 1955 for spring suspension devices for motor vehicles. In that patent a compound spring device was introduced which expanded side wall portions of a rubber bag radially between coil spring convolutions and, so, provided yieldable support portions for the convolutions which not only increased the roadability of the vehicle but permitted the vehicle to be loaded beyond the maximum load limit. Moreover, the unit was capable of restoring spring units which had sagged and the constructions illustrated were capable of eliminating either or both vehicle front and rear end sag. The present invention is directed to certain considerable improvements in the unit described in the aforesaid patent and has important advantages.

One of the prime objects of the present invention is to design an even stronger unit utilizing a synthetic plastic bag in a new construction which not only is much stronger than the previous unit but can be more economically manufactured.

Another object of the invention is to provide a spring suspension unit incorporating a bag of new design which has elastomeric walls of higher tensile strength, as well as greater flexibility, at all operating temperatures.

Still another object of the invention is to provide a spring suspension unit having improved load deflection characteristics, and incorporating a more abrasion resistant plastic bag which also has better weathering properties, higher fatigue resistance, higher tear and puncture resistance, and better oil and gasoline resistant properties.

Still another object of the invention is to provide a unit incorporating a bag of the character described having a thinner side wall which forms supporting nodes for the convolutions which better embrace the coils and will not radially balloon beyond the spring. Because of the lower distortion factor of the bag wall of the present invention, the effective support area of the bag or cylinder is increased by providing more embracing area.

A further object of the invention is to design a unit of the character described incorporating a bag having a low hysteresis quality so that there is less heat generation and build-up in the accordingly longer lived unit in service.

Another object of the invention is to provide a unit incorporating a novel bag which requires much less material in its construction, and accordingly can be more economically manufactured.

A further object of the invention is to provide a unit of the type described having a bag with a greatly reduced column effect in service, and thus a greatly reduced ride affecting "thump", in a situation in which the bags are in substantially a non-inflated condition, as for example, when virtually no load is being borne.

A still further object of the invention is to provide a spring suspension unit including a bag wherein the ends of the bag are thicker than the side wall to not only withstand the abrasion and rubbing encountered by the bag ends in service, but also to act as a base and support for the air valve or other air conveying insert which in the embodiment to be described is heat-sealed in one end of the bag.

A further object of the invention is to provide a suspension unit incorporated cup-shaped end portions joined at their central portion by heat-sealed flanges forming a heavier rib or ring which, in contact with the spring, dimples the bag side wall to tend to destroy the aforementioned column effect of the cylinder, and thereby provide a smoother, safer ride by eliminating the troublesome "thumping" problem mentioned.

Still another object of the invention is to provide a spring suspension unit incorporating a bag with longitudinal ribs on the side and end walls which provide a stronger, and hence safer, bag in service.

Still another object of the invention is to provide an insert for the plastic bag in the suspension unit of the invention which is formed of a material compatible with the bag so that the insert may be heat-sealed in the bag during the bag molding operation and securely bonded in place.

Still another object of the invention is to provide a suspension unit which considers the effect on ride and safety of the bag incorporated therein, in a non-expanded as well as an inflated condition, and is designed to provide optimum ride characteristics for each condition.

Still further objects of the invention are to provide a spring suspension unit which can be easily installed, either as original or auxiliary equipment, which is capable of restoring a vehicle to a normal operating level, which by delivering a satisfactory ride at all operating pressures increases the vehicle's stability and roadability and so promotes safety, and which is capable of being individually filled or operated as an automatic leveling system.

Other objects and advantages of the present invention will become apparent to those of ordinary skill in the art as the description thereof proceeds.

IN THE DRAWINGS

FIG. 1 is a partly sectional, side elevational view of a spring suspension unit incorporating the plastic bag of the present invention, the device being shown in a condition wherein no load is applied and the bag is not inflated;

FIG. 2 is a similar view, with the bag shown bearing a light load and inflated to a low pressure;

Figure 3:
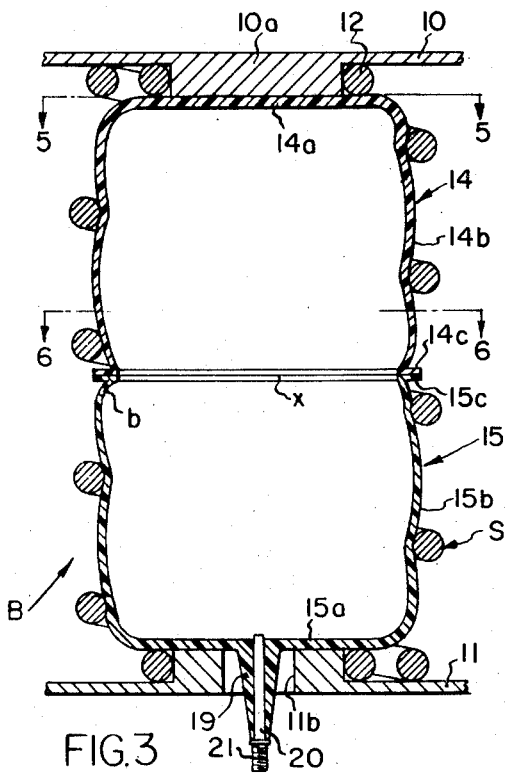
FIG. 3 is a similar view taken on the line 3—3 of FIG. 5, of a slightly modified form of bag in which an inflation valve rather than a hose connector is utilized in the lower portion of the bag, and the bag is under slightly greater load and inflated to a slightly greater pressure, such that it is expanded slightly between the convolutions of the coil spring.

Generally speaking, the suspension systems of truck and passenger cars include either coil springs for the front and rear suspensions or coil springs for the front suspension and leaf springs for the rear suspension. As a result of constant loading, springs, over a period of years, receive a permanent set and can no longer return to initial position, the spring metal slowly and perceptively yielding, due to the stressing of the springs for long periods of time, even with normal loading. The amount of set for a given spring metal is a function of the load and of the length of time of application of the load.

While the prior mentioned patented construction eliminated the sagging caused by loading and had the effect of restoring the vehicle body to its normal position where this was necessary, it did not consider what I term "column breakdown foece". In FIG. 1 of the drawings I have shown an air bag or cylinder B in place within a coil spring S. The bag is shown in a non-expanded condition as a component of an automatic leveling system for a new vehicle, for example, at a time when the vehicle is carrying no load. The bag B is disposed within the coil spring S between a member such as a pressed metal chassis frame bracket 10 and a similar suspension assembly member 11. The various parts mentioned will presently be described in more detail but, for the present, for the purpose of discussing column breakdown force, the aforesaid general description will suffice.

It will be observed that in FIG. 1, the side wall of the bag is not in engagement with the convolutions of the spring S, and the bag or cylinder B has its end walls in engagement with the members 10 and 11 and forms a vertical column which can sustain a certain vertical loading. The column effect is overcome only when a force equal to or greater than what I term the "column breakdown force" is applied to the cylinder to collapse the column. When non-expanded air bag is operated within the coil spring, a "thump" will be felt each time the spring seats strike the cylinder column, and of course, under some driving conditions this may occur several times a minute. The thump is felt as the cylinder or bag is struck and forced to collapse on the jounce. On the rebound, the cylinder will return to normal without damage, ready to thump again.

The present invention is specifically designed to not only provide all advantages of the unit of the previous patent, but also to overcome the ride problem mentioned by so designing the bag as to minimize the column breakdown force which will collapse the bag or column, and thus practically eliminate thump as an undesirable ride characteristic.

Referring now more particularly to the accompanying drawings, it should be understood that the member 10 is a schematic illustration of what may be the chassis frame bracket which extends transversely of the chassis frame at the front end of the vehicle and which may have a dependent metal bracket portion 10a for receiving the upper, reduced diameter, end convolution 12 of the spring S. The member 11 may comprise a portion of a pressed metal cup which includes a seat 11a for the reduced diameter lower end convolution 13 of spring S.

The metal member 11 may be connected to the pivoted lever of the knee of the suspension system, with the inner end of the lever pivoted to the bracket 10 side wall, while the other end is pivoted to the steering knuckle bearing bracket. The above knee-action type spring suspension is employed in conventional motor vehicles for supporting the front end thereof and, of course, road shocks caused by the front vehicle wheels traveling over uneven ground will be transmitted to the metal coil spring S through the knee action lever system. In the prior patent mentioned, a coil spring unit, including a spring S and bag B, were also provided to support the rear end of the vehicle, and it is to be understood that such a unit, which incorporates the bag B to be described, is also contemplated for rear end suspension use.

In the present invention, the bag B is preferably formed of a pair of cup-shaped sections, generally designated 14 and 15, each of which include end walls 14a and 15a, slightly tapering side walls 14b and 15b, and radially out-turned flanges 14c and 15c at their open ends. The side walls 14b and 15b are of reduced thickness relative to the end walls 14a and 15a and also gradually decrease in thickness toward flanges 14c and 15c. Side walls 14b and 15b further gradually increase in diameter toward their open ends.

The cup-shaped sections 14 and 15 are molded of polyurethane and may, for instance, have a side wall thickness averaging one-sixteenth of an inch in thickness. Such a bag will be twice as strong, although much thinner, than a rubber bag of generally the same length and diameter utilized to carry the same load. The flanges 14c and 15c of the cup-shaped sections 14 and 15 are heat-sealed together along their entire peripheral abutting surfaces at $x$. Typical dimensioning for a 10 inch long cylinder, provides a side wall thickness at the radial flanges of 0.065 to 0.070 inches and an end wall thickness of 0.085 to 0.090 inches. Molded integrally on the end walls 14a and 15a, are radial rib portions 14d and 15d respectively, which merge with longitudinally extending ribs 14e and 15e respectively, molded on the side walls 14b and 15b of the bag. These ribs aid material flow during the molding operating and tend to prevent air bubbles being molded into the walls of the bag which would weaken the walls. Thus, by helping insure a uniform side wall free of air bubbles or trapped air, the ribs function to produce a stronger and safer cylinder or bag.

It is to be observed that, in FIGS. 1 and 2, I have shown a hose connector heat-sealed in the end wall of the bag, and it will be noted that the member 11 includes the opening 11b for passing the hose connector fitting or an air inflation valve of suitable character.

Figure 7:
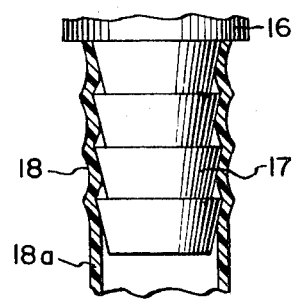
FIG. 7 is a greatly enlarged view, illustrating the manner in which a hose is retained on one of the hose connector members shown in FIGS. 1 and 2.

Of course, either the hose connector insert or the valve may be utilized. When a hose is used to permit remote filling of the air bag, or to attach the unit to an automatic leveling system, the tubular connector 16, illustrated particularly in FIGS. 1, 2 and 7, is employed. The insert must be formed of a plastic material which is compatible with the polyurethane plastic used. A polycarbonate plastic which has no appreciable sulphur content is suitable and may be simply molded in position. The rigid insert will be pre-molded and machined and will simply bond to the bag at the high temperatures of molding of the bag. Clearly, the connector may be either linear, as shown, or comprise an elbow of predetermined angularity. It is provided at its outer end with a series of annular barbs 17. The elastomeric plastic or rubber hose 18 which is utilized, may be simply manually pushed over the end of the connector 16 as shown in FIG. 7, and requires no hose clamp. The barbs 17, which are slightly greater in diameter than the normal inner diameter of the hose 18, expand the hose in the manner indicated in FIG. 7, and prevent the hose from being pulled off and dislocated. In fact, a pulling force exerted on hose 18 only tends to tighten the connection. Because of the higher melt temperature of the polycarbonate (440° F) relative to the polyurethane (400°F), the insert 16 remains rigid during the molding operation and retains all machined dimensions. In the molding process, a body of bag material 19 which is an integral part of the cylinder end wall 15a, is formed around the insert 16. The materials are completely heat-sealed together during the molding of cup sections 15 in view of their compatibility.

Figure 4:
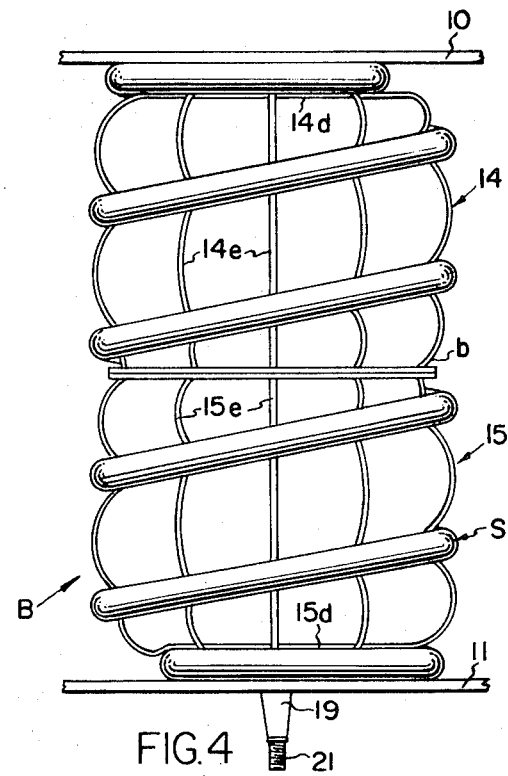
FIG. 4 is a similar view of a unit which is bearing a relatively heavy load, and a relatively high pressure is utilized within the bag to fully expand it between the convolutions of the coil spring.
Figure 5:
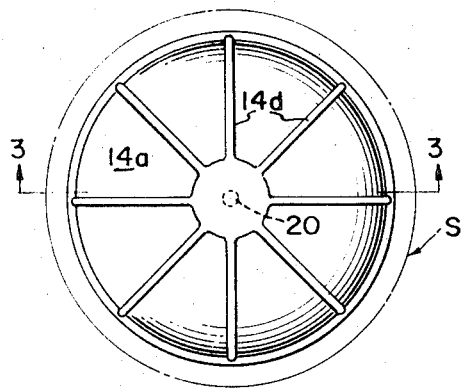
FIG. 5 is a transverse, sectional view taken along the line 5—5 of FIG. 3.
Figure 6:
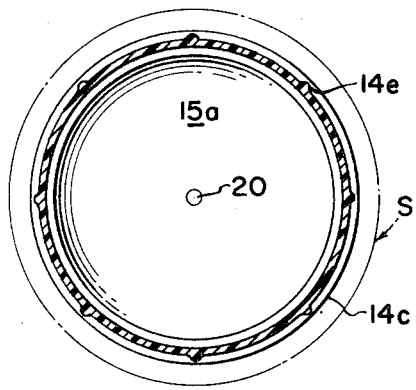
FIG. 6 is a transverse, sectional view taken on the line 6—6 of FIG. 3.

In a similar manner, a conventional valve of the Schrader type may be integrally molded with the end wall 15a of the cylinder as shown particularly in FIGS. 3 and 4. In this instance, the valve body, rather than being formed of brass, is formed of the aforementioned polycarbonate material and the valve insert 20, which is of conventional design and may have a threaded end 21 is likewise integrally molded to the end wall 15a and surrounded by an envelope 19 of polyurethane which is integrally molded with end wall 15a.

Because the cylinder side walls 14b and 15b can be so much thinner than rubber, for instance, the polyurethane being almost 8 times stronger than rubber, the column breakdown factor is greatly reduced, and hence, the thump characteristic is also very greatly reduced. Moreover, because the nodes formed tend to increase the effective area of the bag or cylinder, greater lift or support for a given air pressure is provided than previously. The high modulus of the polyurethane limits the stretch of the 1/16 inch urethane, for example, to approximately that of a ¼ inch wall of synthetic rubber. It is this factor which permits the thinner and more flexible walls of the present bag to more firmly embrace the spring convolutions and prevents the nodes from ballooning beyond the coil where, of course, they accomplish nothing. The bag described not only has greatly improved characteristics but also can be manufactured at less cost.

The fact that the end walls of the cylinder are of greater thickness is important because the cylinder end areas must sustain extra abrasion or rubbing action. Moreover, they, in one instance, must provide a base for the integral molding or heat sealing of a valve or connector insert in position, and must resist forces tending to bend the insert or tear it away.

The column breakdown force is also reduced by the tapering side walls 14b and 15b of the bag. This double taper which is provided in the bag, is also an aid in the final assembly of the cylinder in the sense that the cup portions are easy to install in a heat-sealing device for heat-sealing the flanges 14c and 15c in abutting relation. The taper allows little or no contact except at the flanges to be sealed so that heat can be applied only where it is needed to effect a seal.

As has been indicated, the relatively heavy ring which is formed by the flanges 14c and 15c also contributes greatly to lowering the column breakdown force. This occurs because the ring formed engages the center coil of the spring and tends to bind at this point. This binding causes the bag or cylinder to dimple at the place where the ring engages the spring, and this formation of a dimple, as shown at b in FIGS. 2–4, for instance, tends to destroy the column effect of the cylinder. Moreover, at the central portion of the bag where some additional strength is needed, the heat-sealed flange provides a hoop.

Finally, the concept of integrally molding the valve or hose connector in position is one which eliminates many problems and potential product failures. Where formerly brass inserts had rubber molded to them and the valve was then cemented in position, problems were encountered with selection of the brass, the proper reagents for brass treatment, the varying quality of the brass and concentrations of the reagents treating the brass, the proper rubber compound for adhesion, contamination during the process, and humidity, the present construction eliminates cements and special treatments and the failures which formerly resulted because a proper bond was not achieved.

Because of the unique construction of the barbed hose connectors, hose clamps and ferrules have been eliminated entirely and the whole bag is more simple, inexpensive, airtight and safe. The use of the barbed hose connector also eliminates problems attendant with matching threads and leaking, and the shape of the connector can be gauged to the particular installation. In FIG. 7 the plastic memory of the hose material, which may, for instance, be polyurethane tubing, causes the material to return to normal diameter as at 18a. A pull exerted in a direction to pull the hose off the barbs tends to reduce the diameter or constrict the hose and so tends to tighten it and resist the pull.

In use, the compound coil spring or pneumatic booster B is inserted in a deflated condition between the convolutions or coils of spring S with the air-introducing fitting 16 or 20, as the case may be, projecting through the opening 11a in the lower member 11. When the vehicle is new and substantially without spring sag and no load is to be borne, the air in bag B will be at atmospheric pressure. If a light load, i.e., in the neighborhood of 100 lbs. is to be borne by the unit, the bag B will be inflated with 2 to 5 lbs. of superatmospheric pressure. In FIG. 2, the air bag B is shown as expanded slightly such that its side walls radially engage the coil spring convolutions and the binding contact of the ring formed by flanges 14c and 15c with the spring causes the dimpling or indentation b of the bag to severely reduce the column breakdown force and avoid the thump effect which deleteriously effects ride at low bag pressures. This dimpling effect, while not illustrated in FIG. 1, because the members 10 and 11 are shown in fully separated position, nevertheless is obtained when the vehicle rides over a bump for instance, and the members 10 and 11 are relatively compressed. Thus, the dimpling effect which severely reduces the column breakdown force necessary to destroy the column effect which creates undesirable ride characteristics is also obtained at no load and zero superatmospheric pressure conditions.

FIG. 3 shows a bag B inflated to a slightly greater degree to bear a slightly heavier load. FIG. 4 shows a bag bearing a heavy load up to 1,000 lbs. and inflated with air under a superatmospheric pressure of about 40 p.s.i.

Of course, inflation of the injection molded, non-cellular elastomeric bag B causes the radial expansion of the envelope so that the side wall of the envelope assumes an undulating configuration comprising nodes which project a substantial distance between the convolutions of the spring S, as shown particularly in FIGS. 3 and 4, with the convolutions themselves being received in the roots of the undulating side wall shown, the protruding nodes of the envelope side wall forming supporting areas for cradling the individual convolutions of the spring S. Compared with the former rubber bags, present bags of similar length and diameter can take more air pressure and better conform to the spring convolutions. Because there is no heavy end wall splice, axial expansion is also enhanced. Radial expansion will also occur, where there is a condition of spring sag, to eliminate the sag. As previously, no changes are required in conventional vehicles to utilize the device of the present invention. From a safety standpoint, the bag B will not only slow up the deterioration of the rate of the spring, but will deliver support to weakened springs, and thus will provide a safer ride with increased vehicle stability. In addition, it will function well as an overload device, to enable the body to be loaded beyond otherwise maximum load limits, which delivers support to each individual coil of the spring commencing at the center of the spring and progressing to each end as the pressure in the device is increased. Of course, should a bag B fail at any time, the load continues to be carried by the spring until a new bag is inserted.

When severe bumps are encountered at speeds which would otherwise cause bottoming to occur, the bag prevents the vehicle frame and suspension system from bottoming and it obviates the need for the costly replacement of coil springs which have taken a permanent set. With the present device, the height of the vehicle relative to the ground may be nicely regulated and maintained at optimum height regardless of overload or sag. Moreover, the unit permits the suspension system of the vehicle to well handle road shocks in a safe manner under all conditions of loading. The units prevent dangerous rythmic bouncing, swaying and fishtailing from occurring.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A spring suspension unit adapted to extend between two spaced, relatively movable members such as vehicle frame and suspension members so as yieldably to maintain said members in spaced relation, said unit including:
    a coil spring extending between said members;
    an inflatable elastomeric bag disposed within said coil spring and expandable to dispose side wall portions of the bag between the convolutions of the spring;
    said bag being formed of cup-shaped portions, comprising end and side walls, and having radially outwardly projecting flanges at their open ends;
    said flanges being heat-sealed in abutting air-sealed relation and providing a radially projecting convolution engaging ring; and
    means leading from exteriorly of said bag into one of said portions to introduce air under pressure thereto.

2. The combination defined in claim 1 in which said cup-shaped portions gradually enlarge in diameter toward said open ends.

3. The combination defined in claim 1 in which radially extending ribs are provided on the end walls of said cup-shaped portions which merge with longitudinal ribs on the side walls extending to said flanges.

4. The combination defined in claim 1 in which said end walls are of greater thickness than the side walls.

5. The combination defined in claim 4 in which a tubular insert is heat-sealed in one of said end walls by enveloping it in said plastic material and functions as said air introducing means.

6. The combination defined in claim 5 in which said insert is a hose connector formed of a compatible plastic material.

7. The combination defined in claim 5 in which said insert is a valve insert formed of a compatible plastic material.

8. The combination defined in claim 6 in which said insert includes a barbed outer end receiving a hose having an internal diameter slightly less than the diameter of said barbs, thereon.

9. The combination defined in claim 1 in which said elastomeric is polyurethane.

10. A method of making a bag for use inside a coil spring as a spring support aid for the convolutions comprising the steps of:
    molding an elastomeric cup-shaped body with a radially outwardwardly projecting flange at its open end;
    molding a like cup-shaped body; and
    heat-sealing the flanges of the body in abutting airtight relation to form a ring on the bag formed.

11. The method of claim 10 wherein an air admitting insert formed of a compatible material is molded integrally in one end of one of the bodies.

12. The method of claim 11 in which said bodies are molded of polyurethane and said insert is formed of a polycarbonate having a higher melting temperature which bonds thereto at the melt temperature of the polyurethane.

13. A spring suspension unit adapted to extend between two spaced relatively movable members such as vehicle frame and suspension members so as yieldably to maintain said members in spaced relation, said unit including:
    a coil spring extending between said members;
    an inflatable, flexible synthetic plastic bag having a plastic memory which returns it to original condition from a stretched condition, disposed within said coil spring and expandable to dispose side wall portions of the bag between the convolutions of the spring;

said bag being formed of sections, comprising end and side walls, and having radially projecting flange portions;

said flange portions being sealed in abutting air-sealed relation; and means leading from exteriorly of said bag into one of said sections to introduce air under pressure thereto.

14. The combination defined in claim 13 in which said plastic is polyurethane.

* * * * *